United States Patent [19]
Barnes

[11] Patent Number: 5,841,507
[45] Date of Patent: Nov. 24, 1998

[54] LIGHT INTENSITY REDUCTION APPARATUS AND METHOD

[76] Inventor: Elwood E. Barnes, Rte. 3, Box 316, Cochranville, Pa. 19330

[21] Appl. No.: 904,396

[22] Filed: Jul. 31, 1997

Related U.S. Application Data

[63] Continuation of Ser. No. 476,421, Jun. 7, 1995, Pat. No. 5,671,035.

[51] Int. Cl.⁶ .................................................... G02C 7/12
[52] U.S. Cl. ........................... 351/49; 349/13; 250/203.4
[58] Field of Search ............................... 351/49, 158, 41; 349/13, 14; 250/203.4, 204, 205, 206, 206.1, 206.2; 359/227

[56] References Cited

U.S. PATENT DOCUMENTS

| | | |
|---|---|---|
| 3,167,607 | 1/1965 | Marks et al. . |
| 3,245,315 | 4/1966 | Marks et al. . |
| 3,409,909 | 11/1968 | Scott et al. . |
| 3,943,573 | 3/1976 | Budmiger . |
| 3,961,181 | 6/1976 | Golden . |
| 4,021,935 | 5/1977 | Witt . |
| 4,071,912 | 2/1978 | Budmiger . |
| 4,152,846 | 5/1979 | Witt . |
| 4,155,122 | 5/1979 | Budmiger . |
| 4,279,474 | 7/1981 | Belgorod . |
| 4,462,661 | 7/1984 | Witt . |
| 4,482,326 | 11/1984 | Witt . |
| 4,491,390 | 1/1985 | Tong-Shen . |
| 4,848,890 | 7/1989 | Horn . |
| 5,076,669 | 12/1991 | Black et al. . |
| 5,114,218 | 5/1992 | Black et al. . |
| 5,184,156 | 2/1993 | Black et al. . |
| 5,276,539 | 1/1994 | Humphrey . |
| 5,305,012 | 4/1994 | Faris . |
| 5,339,152 | 8/1994 | Horn . |
| 5,382,986 | 1/1995 | Black et al. . |
| 5,412,439 | 5/1995 | Horn . |

FOREIGN PATENT DOCUMENTS

| | | |
|---|---|---|
| 53-6057 | 1/1978 | Japan . |
| 2137373 | 10/1984 | United Kingdom . |

OTHER PUBLICATIONS

"Crashlander", Larry Niven, Published by Ballantine Books, 1994, cover and first two pages.
"Grendel", Larry Niven, Published by Ballantine Books, 1994, pp. 123, 124 and 145.

Primary Examiner—Hung Xuan Dang
Attorney, Agent, or Firm—Fish & Richardson P.C.

[57] ABSTRACT

A device for selectively reducing the intensity of light in the field of view of an eye or of an optical instrument is described. The device can reduce the light intensity emanating from multiple sources. In one embodiment, an eye gear has a frame, a power source, a light sensor, two light transmissive lenses having an array of shutter elements, user controls and processing circuitry. The user controls are utilized to set user constants to customize the apparatus, and may be used to select a mode of operation. During operation, the light sensor scans the field of view and produces light intensity signals. These light intensity signals are processed with the user constants and preset threshold values. If the light intensity signals exceed any of the threshold values, then one or more elements of the shutter matrices of each lens is darkened.

18 Claims, 4 Drawing Sheets

LIGHT INTENSITY REDUCTION APPARATUS AND METHOD

This is a continuation application based on U.S. application Ser. No. 08/476,421 filed on Jun. 7, 1995 now U.S. Pat. No. 5,671,035.

FIELD OF THE INVENTION

The present invention relates to an apparatus and method for reducing light intensity. In particular, active sunglasses are described which selectively block light from the sun and/or other sources by proportionally darkening an element or elements on a shutter matrix located on each lens.

BACKGROUND OF THE INVENTION

It is possible to fabricate sunglasses having high optical attenuation characteristics for reducing the light from the sun to a tolerable level. Such sunglasses permit the user to look directly into the sun, however, little else can be seen because the light attenuation is so high that other parts of the field of view that are not brilliantly lit are not discernible.

Driving a vehicle in situations when the sun is near the horizon, or when driving directly towards some other bright light source in a low ambient lighting condition, may be hazardous since certain traffic situations require looking directly into the source of light. Dark sunglasses, visors, and other means to shade the windshield have been developed to alleviate the effects of glare and reflections from the sun and other sources, but because of variables such as the path followed by a vehicle, and the changing angle between the driver and the source, such light blocking strategies have not proven to be entirely satisfactory.

SUMMARY OF THE INVENTION

It is an object of the present invention to provide an apparatus and method to block light only in the area or areas of the field of view where a light level threshold, which may be selected previously by the user, is determined to be excessive, so that other objects in the field of view are still discernable.

Another object of the invention is to provide an apparatus and method for blocking light from one or more sources incident on an optical instrument, such that the recording media of the instrument can record the details in the field of view.

A further object of the invention is to provide a method and apparatus for use by persons who are vision impaired. An apparatus according to the invention is capable of reducing the dynamic range of incident light to be handled as well as limiting the rate of light reduction.

An apparatus according to the invention comprises a power source, a light sensor capable of producing a plurality of light intensity signals corresponding to the light in the field of view, a light transmissive lens having a plurality of programmable shutter elements, user controls, and processing circuitry. The processing circuitry processes the light intensity signals with respect to predetermined threshold values and user constants, and then darkens one or more shutter elements depending on the processing results. The user controls are used to set user constants to customize the apparatus, and may be used to set one or more modes of operation.

An apparatus according to the invention functions with non-coherent light sources, or light sources having a broad beam width such as one might find from the sun, or from headlights, taillights, light reflections and the like. Further advantages and features will become apparent in view of the ensuing description and drawings.

DETAILED DESCRIPTION

Figure 1:
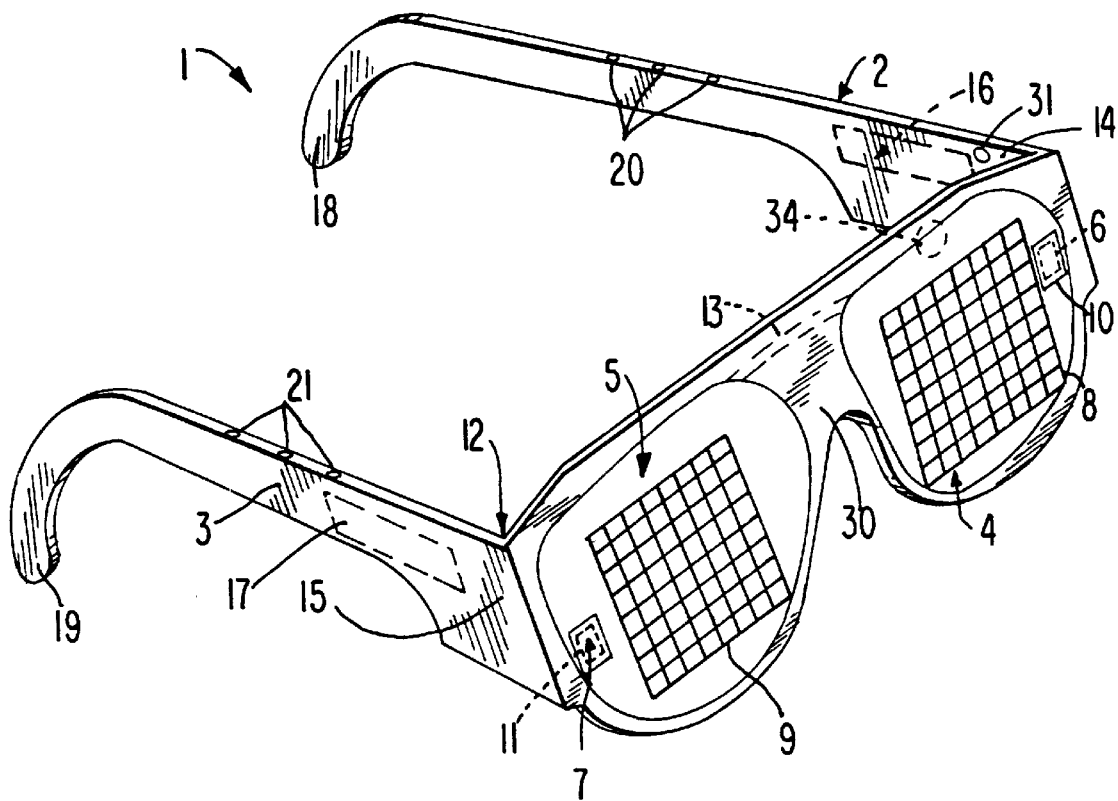
FIG. 1 is a perspective view of an embodiment of a light intensity reduction apparatus according to the invention.

FIG. 1 is a perspective view of an embodiment of a light intensity reduction device 1 according to the invention. The embodiment depicts a pair of active sunglasses 1 having all functional parts located in the frames or in or on the lenses. The term active sunglasses is defined herein as a device whose purpose is to reduce the light level from one or more sources, which could include the sun and its reflections as well as headlights, tail lights and other sources, in both day and nighttime conditions. Further, a device according to the invention can also be used to protect the eyes when utilizing reading glasses, cameras, camcorders, telescopes, binoculars, microscopes and other monocular or multi-lens optical instruments from the deleterious effects of bright light sources, such as the sun. Further, such a device can be used to protect or reduce the deleterious effect of bright sources incident on the detectors, storage media or other components of cameras, camcorders, telescopes, microscopes or other optical instruments. For example, use of the invention in front of or behind the lens of cameras or camcorders allows pictures to be taken towards or directly into the sun, without producing multiple images, without over-exposing the film, or without washing-out the details of the other objects in the field of view.

In order to better understand the operation of the present invention, a brief discussion concerning how the human eye reacts to different light intensities follows. The amount of light falling onto the photoreceptors in the rear of the retina of the eye is controlled by the iris. If the light level suddenly increases, then the iris will contract to reduce the amount of light admitted to the retina. As the same time, because of the sensed increase in light intensity, the retina begins reducing the sensitivity of its photoreceptors, so that the combination decreases the perceived light level more than the changes to either the retina or iris alone would produce. This means that details that were discernible before the introduction of increased light may be lost due to the smaller opening in the pupil and the less sensitive retina. It is also important to note that the human eye responds to changes in light intensity in approximately 50 to 100 ms, depending upon the light level and other variables. The active sunglasses of the present invention function by responding faster that the eye to increases in light level to reduce the amount of light from the regions in the field of view that are very bright. Such operation means that the eye is able to maintain fairly constant sensitivity, somewhat constant iris size and photoreceptive sensitivity. Therefore, objects which otherwise might have been lost by the presence of the very bright source will be discernable. The active sunglasses thus reduce the dynamic range of light delivered to the eye, and further reduce the influence of bright sources of light on the perception of the rest of the objects in the field of view. Individuals who are vision impaired may also find the present sunglasses useful since the sunglasses can reduce the rate of change of light intensity as well as reduce the dynamic range of light in the field of view, as will be explained below.

The active sunglasses according to the invention have the ability to selectively block bright sources of light within the field of view of the user without darkening other regions in the field of view. Thus, extreme increases and decreases in light intensity entering the eye are avoided. The change of intensity problem can be understood by considering the temporary optical confusion that occurs when the sun suddenly shines into a person's eyes from the windshield of an approaching car. It may be bright enough to cause the person to close her eyes momentarily. In this instance, the average light level across the field of view would probably change very little, but the peak value suddenly increased only over a small portion of the field of view to cause discomfort. In this situation the dynamic range of the field of view has increased. The increased light intensity can be attenuated from just this region of the field of view. Further, the present invention can ameliorate the discomfort of large rates of change of the average light level or intensity in the field of view. This rate of change of average level problem can be understood by considering the discomfort that occurs when leaving a darkened theater into bright sunlight. It may take the eyes several seconds to adjust to the extreme increase in average light level, even though the dynamic range may not change. In both cases just described, the active sunglasses can limit peak light levels and dynamic range as well as the rate of change of the average levels themselves so as to ease vision discomfort.

The ideal sun protector for driving would be an opaque disc hanging in space that is large enough to totally occlude the sun and that is centered on a vector defined from the retina of the user to the sun. Further, it would be important to maintain this relationship of the opaque disc to the sun as the heading varies between the eye of the user and the sun. In such a situation, vision would be normal except in the portion of the field of vision that is being blocked by the opaque disc where the sun resides at that particular instant of time. Individuals attempt to do this by holding up one hand so as to block the sun. In addition, controlling the opacity of the blocking disc such that the level of the light from the sun approximates that of the surroundings would be preferable to completely opaquing light from this region in many cases, for example, when the region might contain an approaching vehicle. Further, it would be beneficial to block reflections from the sun that originate from multiple surfaces, or from multiple sources. In addition, when driving on the road at night, a vehicle operator not only encounters the light from approaching headlights, but also light reflections from the headlights of following vehicles in the interior and one or two exterior rear view mirrors. Although some vehicles have internal manual or electronic means for dimming the image presented by an interior mirror, few can dim the images provided by the outside mirror or mirrors. The active sunglasses will reduce the bright light not only from approaching vehicles, but also from those images presented by both interior and exterior mirrors, thereby reducing light level changes and easing optical stress.

The sunglasses 1 consists of two Liquid Crystal Device (LCD) lenses, 4 and 5, mounted in a bridge 30 of the frame. Although the term "LCD" is used to describe the material used in the lenses 4 and 5, one skilled in the art would understand that alternative materials such as ferroelectrics, liquid crystal materials in general, or other materials having light transmission characteristics that can be changed over a wide range of light intensities, could be used to functionally replace the LCD materials in the shutter matrices or sensor arrays. The left LCD lens 4 contains a sensor array 6, and the right LCD lens 5 contains a sensor array 7, mounted on the outside edge near the connections of the bridge 30 to the temples 2 and 3. Each sensor array 6 and 7 has a respective associated photosensor 10 and 11 mounted behind it. A user looks through the left LCD lens 4 which contains an associated shutter matrix 8, and through the right LCD lens 5 which contains a shutter matrix 9. Control electronics 16 and 17 are housed in each of the temples 2 and 3, and communicate to the bridge 30 via connections 14 and 15. The control electronics 16 and 17 may also communicate with each other via the LR Connection 13 (shown in dotted line). A pupil position sensor 34 may be mounted on the bridge to determine the position of the pupil, and is connected to the control electronics 16. Power supplies 18 and 19 and user controls 20 and 21 are also located in the temples 2 and 3, as shown. The power supplies 18 and 19 may comprise batteries, solar cells or other light-weight power supplies. Thus, all of the components needed for operation are self-contained. In particular, the temples 2 and 3, which fit over the ears, house the electronic circuitry, controls and power sources, while the bridge 30 houses the lenses 4 and 5, sensor arrays 6 and 7, and shutter matrices 8 and 9.

A user wears the active sunglasses by unfolding the temples and placing the bridge 30 across his nose in a conventional manner so that the LCD lenses 4 and 5 are in place over each eye. Power is applied to the control electronics 16 and 17 by a switch 12 located on the inside of temple 3 when the temple pieces are opened before the sunglasses 1 can be placed on the head. When the temple pieces are folded to flatten the sunglasses when removed from the head, the switch 12 is opened and power is removed. A low-power indictor 31, which may comprise an LED or other low-power consuming component, is shown attached to the inside of temple 2. When power is low, the indicator 31 lights up to alert the wearer. Alternately, several elements of a shutter matrix may be utilized to display a low power indication.

As shown in FIG. 1, each lens 4 and 5 consists of a light transmissive glass or plastic substrate containing LCD material which contains two square shutter arrays 8 and 9, each consisting of an 8 by 8 matrix of elements, or 64 square-shaped elements. Each element of each shutter matrix is addressable by the control electronics 16 and 17. Further, the light transmission characteristics of each matrix element may be controlled so that an element will be darkened only to the extent required by the lighting conditions. Alternately, any or all of the shutter matrix elements may be set to darken to a pre determined extent. A user looks through the shutter matrices 8 and 9 when wearing the sunglasses 1, and thus the user's visual field is determined by the transmissive state of the LCD shutter matrix elements. The amount of light impinging on the retina of each eye can be reduced by darkening one or more of the LCD elements in the shutter matrix 8 and 9 located along an imaginary line between the user's retina and the sun. In normal lighting conditions, each element of the shutter matrices 8 and 9 will be transparent.

Referring again to FIG. 1, photodetectors 10 and 11 are mounted behind sensor arrays 6 and 7, which are also divided into an 8 by 8 active matrix. During operation, each sensor array is scanned so that its associated photodetector can sample or infer the light level from a given region in the visual field of the user. In this manner, the control electronics 16 and 17 determine the vector associated with each element of the field of view of the sensor array. Information gained from the sensor arrays is t hen used to darken appropriate elements of the LCD shutter matrices 8 and 9, to reduce the level of the light intensity in the visual field of the user to tolerable limits.

Figure 2:
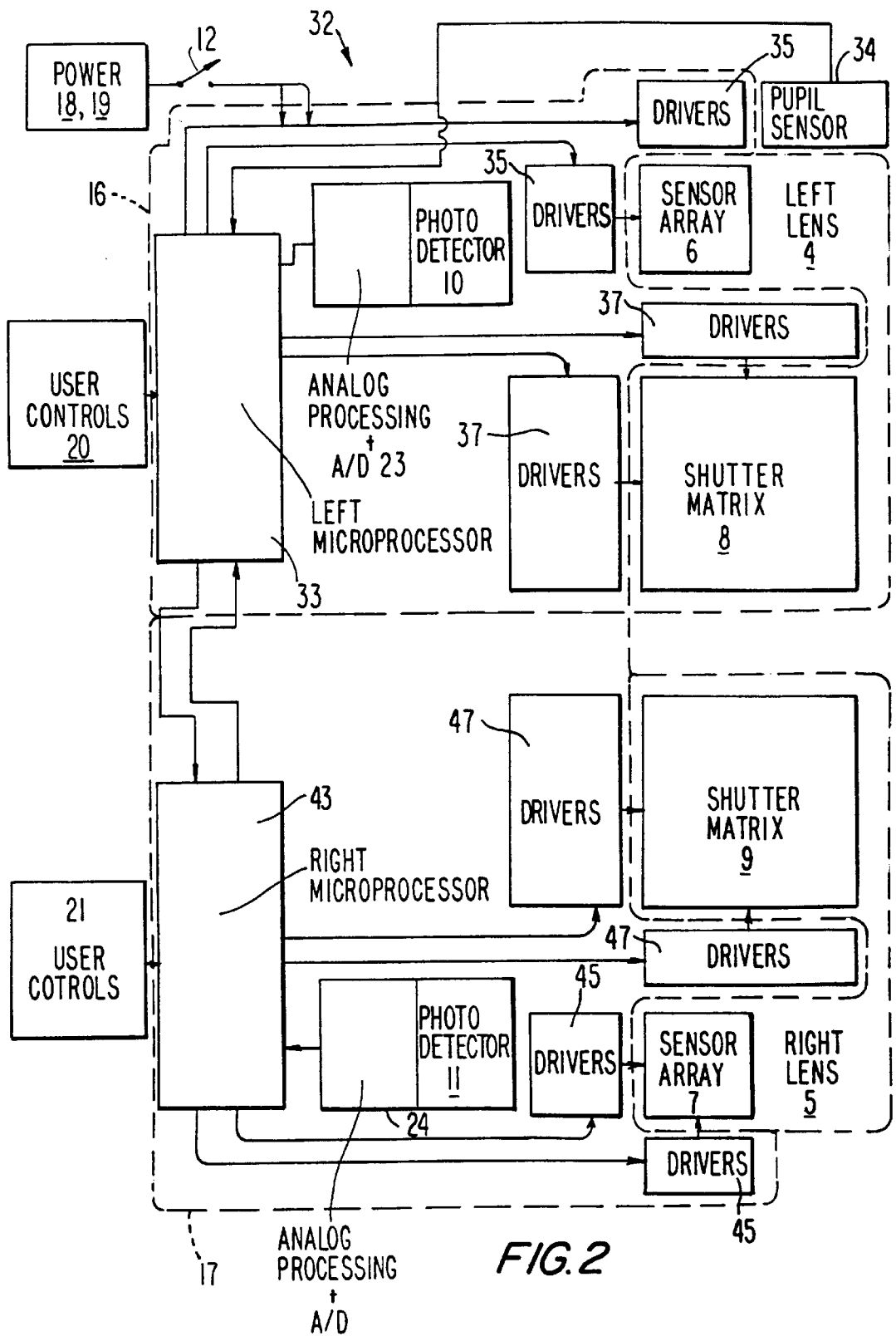
FIG. 2 is a simplified block diagram of the electronic circuitry which may be employed by the device of FIG. 1.

FIG. 2 is a simplified block diagram 32 of the control electronics 16 and 17 of the sunglasses of FIG. 1. In particular, the control electronics 16 for the left lens 4 comprises a microprocessor 33 that is connected to the user controls 20, to the photodetector 10 through the analog processing circuitry and A/D converter 23, to the shutter matrix 8, to sensor array 6, to a power source 18 through switch 12 and optionally to a pupil position sensor 34. The microprocessor 33 sends commands to individual elements of the sensor array 6 through drivers 35. The microprocessor 33 also sends commands to proportionally darken and/or lighten individual elements of the shutter matrix 8 through drivers 37. The user controls 20 can be manipulated by a user to input user preference data and information concerning the physiology of the user, as explained below. Similarly, the control electronics 17 for the right lens comprises a microprocessor 43 connected to user controls 21, to the photodetector 11 through the analog processing circuitry and A/D converter 24, to the shutter matrix 9 and to a power source 19 through switch 12. The microprocessor 43 sends commands to individual elements of the sensor array 7 through drivers 45, and sends commands to darken and/or lighten individual elements of the shutter matrix 9 through drivers 47. User controls 21 can be manipulated by a user to input data.

It should be noted that the control electronics shown in FIG. 2 contains two separate systems, one for each eye, consisting of a sensor array, a photodetector and a shutter matrix and control electronics. Each of the control electronics 16 and 17 may include microprocessors, digital signal processors (DSP), custom or semi-custom chips, interface circuits, linear and electronics parts having ROM and RAM and/or some other non-volatile memory device such as an EEPROM or battery protected RAM. It should also be understood that the control electronics for each lens can operate independently if so desired, or may exchange data and commands via the LR connection 13.

Each sensor array 6 and 7 of the active sunglasses of FIG. 1 has associated with it a light sensing photodetector 10 or 11, and hence a sun vector can be computed independently for each shutter matrix. This information is exchanged between the electronics of both lenses via the LR connection 13. For example, the logical OR of the processed output of both sensor arrays 6 and 7 can be used to darken elements of both shutter matrices 8 and 9. Such operation means that the LCD elements of shutter matrix 8 made opaque on the left lens 4 is a composite of the information calculated for the left lens 4 by the control electronics 16 as well as from the information calculated for the right lens 5 by the control electronics 17. Similarly, the LCD elements of shutter matrix 9 darkened on the right lens 5 is a composite of data calculated by the right control electronics 17 from information from right sensor array 7 and from information calculated for the shutter matrix 8 from the control electronics 16. In some cases, however, the elements to be darkened may be no different then if there was no communication between the control electronics 16 and 17. The described arrangement therefore allows for the presence of the sun or other bright object to be blocked for each eye even though one sensor array might be in a shadow or occluded in some other way. For example, the left sensor array 7 may be occluded from the sun or other light source by a windshield corner post, rear view mirror, windshield dirt or a windshield decal. Additionally, dust, perspiration, moisture or some other opaque substance may attach itself to one or more elements of the sensors array 7 to render the array only partially operational, yet the shutter matrix 9 will continue to operate and block bright light sources by using whatever information could be obtained from the sensor array 7 as well as information gleaned from the sensor array 6 associated with the other shutter matrix 8. It should be understood that other information, such as user offsets and other user constants, as well as blocking information, may also be exchanged between the control electronics 16 and 17.

Again referring to FIG. 1, the user controls 20 and 21 are a series of switches mounted along the temple pieces 2 and 3 which allow the operation of the sunglasses 1 to be customized for the physiology of a user. The user must use switches 20 and 21 when first utilizing the sunglasses 1 because it is important to map the LCD sensor arrays 6 and 7 onto the shutter matrix elements 8 and 9 so that the darkened elements coincide with the field of vision of the user.

Figure 3:
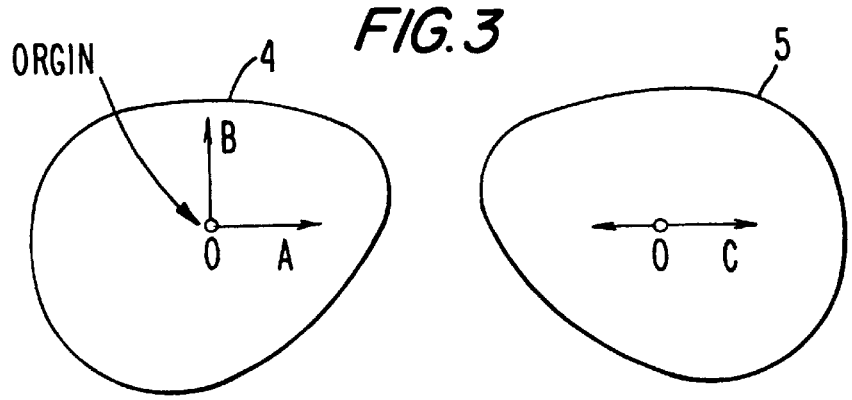
FIG. 3 is a simplified diagram of the lenses of FIG. 1 to illustrate how user constants are set.

FIG. 3 is a simplified diagram of the tenses 4 and 5 of the active sunglasses of FIG. 1. In FIG. 3, the point or points that defines the origin "0" for each eye of the user, which corresponds to one or more elements of each shutter matrix, must be ascertained. There are two offsets: the x-axis offset is labelled A, and the y-axis offset is labelled B. To set these user constants, a person wearing the sunglasses stares straight ahead with the left eye while the right eye is closed, and a single element of the shutter matrix 8 is darkened which is centered in the location considered by the control electronics 16 as the origin. The user manipulates the position of this element by using the switches 20 and 21 until a single darkened LCD element is centered over his left eye when he is looking straight ahead. These two offsets, or user constants are then stored by the control electronics 16 and 17 in non-volatile memory. A third offset labelled C provides a constant associated with the difference in eye spacing of the user to ensure that the origin of shutter matrix 8 on the right lens 5 is centered over the retina of the right eye. This might be accomplished by closing the left eye after the A and B adjustments have been made and then moving a darkened "target" element on the shutter matrix 9 of the right lens 5 until it is centered in front of the user's right eye while he is staring straight ahead. These user constants A, B and C are then stored in non-volatile memory of both of the control electronics 16 and 17 and do not have to be loaded again. An EEPROM, battery backed-up RAM or other non-volatile memory may be used.

After initial set-up, the user only has to open the frame, place the glasses on his nose and the constants A, B and C appropriate for his physiology are loaded. Of course, the user constants could be adjusted at a later time for different users, or memory storage could be provided to store the constants for multiple users. This type of system assumes that the right eye is aligned in the horizontal plane with the left eye since only three constants are stored, however, two other constants E and F might be used on a more sophisticated model to allow centering of the right eye to accommodate users having eyes that are slightly offset to the horizontal plane of the sunglasses.

Differences may exist in the distance between the plane of the shutter matrix elements and the retina of the user (either because of physical variations or the manner in which the user opts to wear the sunglasses on her nose) and thus another correction may have to be entered. This is called the "Z" constant and allows the control electronics to modify the apparent LCD element "solid" angle to compensate for differences in distance from the user's retina to the plane of the elements of shutter matrix, best shown as "Z" in FIG. 5. For example, if a user wears the active sunglasses so that the shutter matrices are close to her retinas, then only one matrix element per shutter matrix would be darkened to block a certain high intensity light signal. However, if the user wears the active sunglasses such that the distance between her retinas and the shutter matrices is increased, then two or more matrix elements per shutter matrix would be darkened to block the same high intensity light signal. One way to compensate for such a user preference is to enter the set up mode and, using a bright light source, such as an incandescent lamp or the sun, optimize this user constant. For example, while wearing the sunglasses, the user moves her head through a 30 degree angle or more in either direction and the constant Z is varied by manipulating the user control until the bright source is blocked most effectively. This allows the control electronics to map the sensor array information most effectively into the elements of the shutter matrix. The Z adjustment can also be provided by mechanically adjusting the distance from the sensor array to the photodetector. This Z constant is then stored in the control electronics and loaded at time of power up. It is to be understood that other such constants could be determined and stored in a similar manner to more optimally match the performance of the active sunglasses to a user.

In all of the discussion, operation of the active sunglasses depends upon the user positioning his pupil and retina in the center or rest position since this is the position that was used to define and load the A, B, and C constants. Hence, the effectiveness of the shadowing of the shutter matrix will depend upon how close the pupil is to the straight ahead or rest position. While wearing the active sunglasses, the user will learn to center his pupil behind the darkened region of the shutter matrix where the control electronics have been taught to believe is the location of the pupil. To ease this constraint and to possibly allow a wider range of operation, a means for sensing the position of the pupil or retina would allow for compensation for movement of the eye. Referring to FIG. 1, one or more retina sensors 34 would be mounted in or on the frame so as to determine the location of the pupil and output this location information to the control system. The control electronics 16 and 17 would use the pupil location information to modify the original values used to map the sensor array information into the shutter matrices. The appropriate elements of the shutter matrices would then be darkened to compensate for the new position of the pupils.

Only situations involving the sun will be considered for the following discussion concerning the operation of an embodiment of the present invention, even though it is understood that the apparatus is equally appropriate for use in other situations involving other sources of light, during the day or night.

Figure 4:
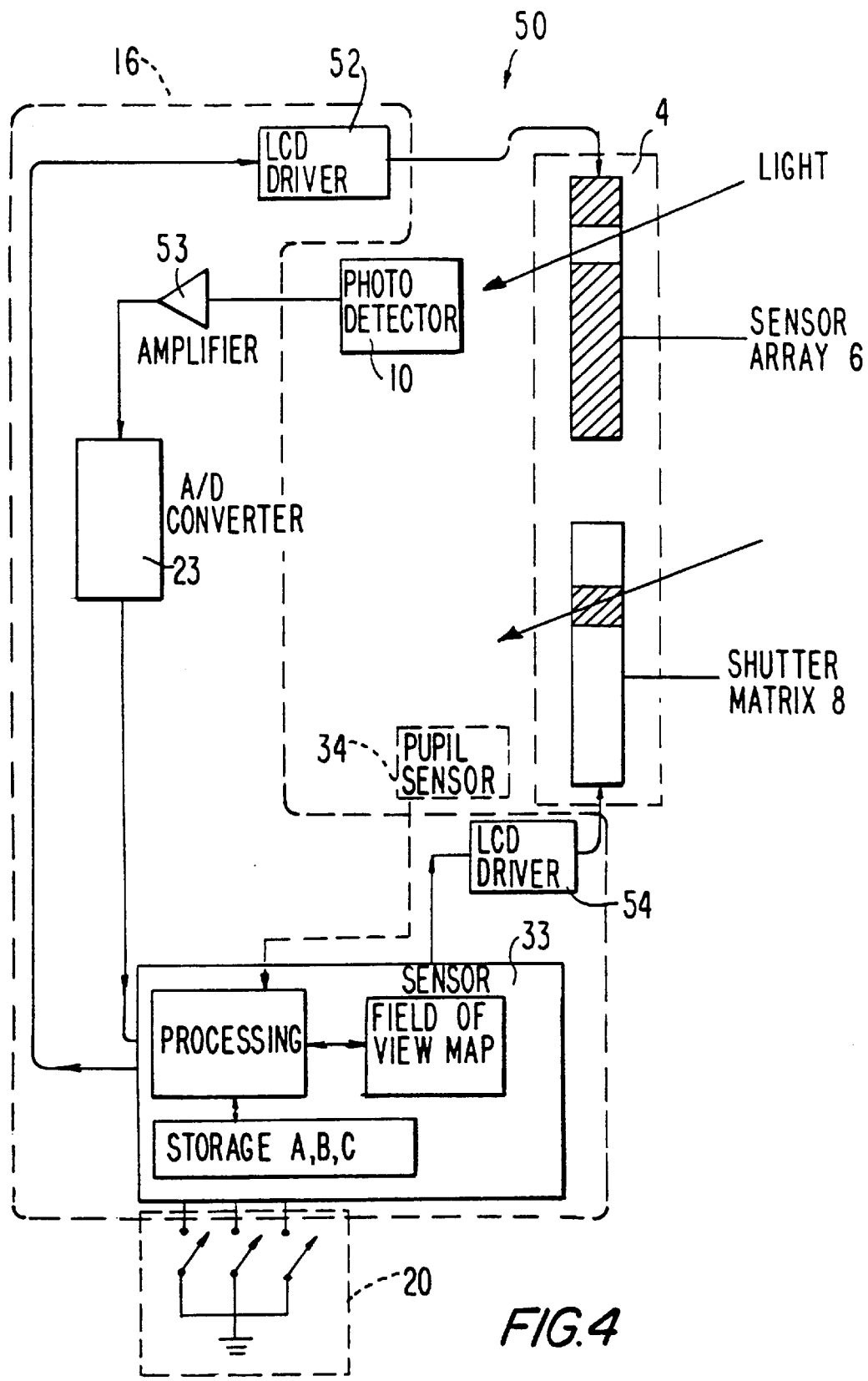
FIG. 4 is a simplified block diagram of the components associated with another embodiment of a device according to the invention.

FIG. 4 is a simplified block diagram 50 of another embodiment of a device according to the invention that employs only one lens. For ease of reference, like components with respect to the sunglasses of FIG. 1 have been numbered the same. During operation, the control electronics 16 provides a scanning signal to the LCD drivers 52 which drive the 8 by 8 elements of the sensor array 6. The elements of the sensor array 6 are driven so that only one element of the 64 LCD elements is transparent while the other 63 elements are darkened or opaqued. In this way, information is obtained concerning the amount of light in the direction defined by the location of the one transparent LCD element, the geometry of the sensor array, the photodetector 10, any mask, lens or optics associated with the photodetector and the physical relationship of the photodetector to the LCD element. The output of the photodetector 10 provides a signal that is proportional to the amount of light collected from this section of the visual field defined by the transparent element. This light level as well as the location of the source, determined by which of the LCD scanning elements in front of the photodetector was transparent, defines a sun vector. The signal from the photodetector 10 may be amplified by an amplifier 53 before being input to an A/D (analog to digital) converter 23 or other means of digital conversion, which stores the light level associated with this elements in a digital format. However, the measure obtained is the amount of light obtained from the one transparent element as well as that from the 63 opaque elements. If the LCD elements when opaque allow some small amount of the light to get through, then this is multiplied by 63 and is mixed with the signal from the transparent element. To reduce the error that occurs due to this operation, a measure is obtained of the total leakage of light by darkening all of the elements and measuring this resulting signal. The measure thus obtained, $V_x$, is called the background or dark current. After all of the 64 elements are darkened so that the background current or the dark current can be measured, then the amount of error present in the light from the selected transparent element is thus approximately $V_{xi\ single} - V_x$.

After the entire visual field has been scanned, element by element as described above, an array of numbers will have been collected that reflect the distribution of light levels in the visual field of the device determined by the sensor array 6. Based upon user information stored earlier, and any preset threshold values, a decision is made by the control electronics and a signal is sent to the LCD driver 54 to block or reduce light from one or more places in the visual field by proportionally darkening a selected element or elements of the shutter matrix 8 if the level stored per element from the data obtained from the sensor array 6 exceeds some threshold value $V_n$. An optional pupil sensor 34, shown in dotted lines, may be connected to the microprocessor circuitry 33 to compensate for pupil location other than for the straight ahead position that was used to load the user constants.

Figure 5:
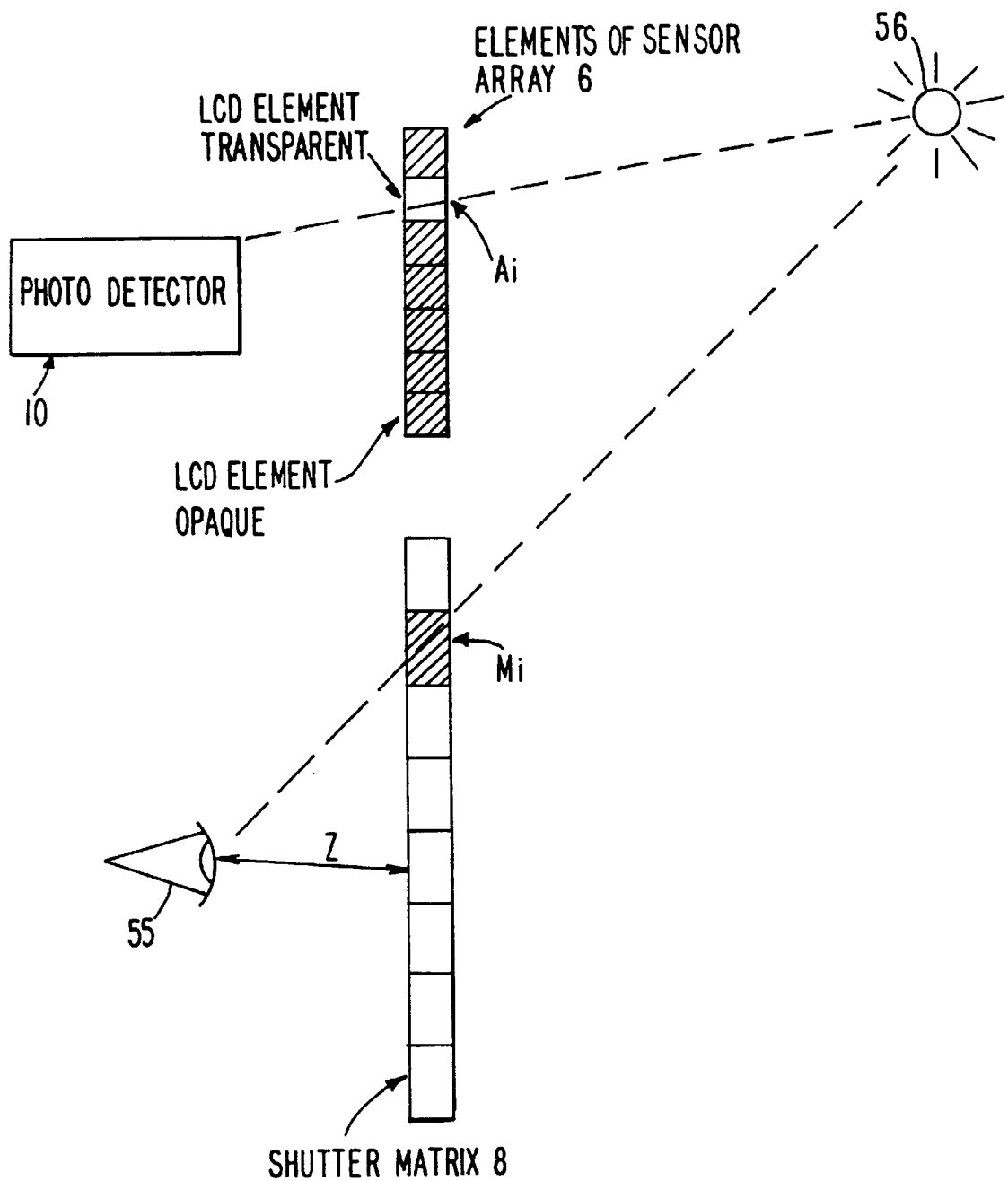
FIG. 5 is a simplified side view of the sensor array and shutter matrix of FIG. 4.

FIG. 5 is a simplified side view of the sensor array and shutter matrix of FIG. 4. It should be understood that FIG. 5 is not drawn to scale, and that the eye 55 and rays from the sun 56 are symbolically depicted to promote a better understanding of the invention. Assume that, as the light sensor array 6 is scanned, the light collected from one transparent element $A_i$ exceeds a threshold value $V_n$. The light values obtained from the other elements are less than that threshold value. Hence one element $M_i$ in the shutter matrix 8 is to be darkened that corresponds to the vector associated with the element $A_i$ obtained from the sensor array 6. The location to be darkened on the shutter matrix 8 is found by taking the location, the $X_i$ and $Y_i$ address of the element corresponding to the location in sensor array 6 that produced this signal, and processing this information with the offset constants (or user constants) that have been stored in a non-volatile memory location in the control electronics 16. This information is sufficient to locate the coordinates of $M_i$, which is the desired element of shutter matrix 8 to be darkened. The control electronics 16 then commands the LCD drivers to darken this element of the LCD shutter matrix 8 to the extent needed. Next, scanning of the sensor array 6 continues and a fresh update of the measure of the visual field is obtained as rapidly as the LCD sensor array 6 can be addressed and the photodetector 10 can measure the light level. In the active sunglasses configuration of FIG. 1, this process proceeds independently for each lens, but the information may be shared to darken elements for both shutter matrices 8 and 9. Information obtained from an optional pupil sensor 34 (shown in FIG. 4) may be used to modify the position and/or to determine the number of shutter elements to be darkened, depending on the position of the pupil of the eye 55.

It should be apparent that more than one light source or target can be handled by this technique. Hence, light directly from the sun, light reflected from other objects and light from other sources can be suppressed. Further, except for the fact that the average light signal levels will be different, a device according to the invention can be used at night, being particularly effective for rainy conditions when multiple images of oncoming headlights are produced by reflections from wet road surfaces and other objects. The effectiveness of the device in handling multiple targets, day or night, depends upon the material and artwork resolution used in the LCD elements, the computations resources available, the operating temperature, power supply life, and cost considerations. In particular, some LCD materials become sluggish in operation as the temperature decreases and this condition must be taken into consideration when using such materials in sunglasses intended for use in colder climates. Yet further, if the region providing the reflected light is larger or smaller than the original source of illumination, then the appropriate shutter configuration will be darkened to accommodate this situation within the granularity of the LCD sensor array and shutter matrix elements. In other words, one or more elements of the shutter matrix 8 or 9 will be darkened in whatever pattern necessary to diminish the light intensity received by the eye.

It should also be understood that a device according to the invention could be added to corrective lenses for persons who are nearsighted or farsighted, or who suffer from an astigmatism. In addition, light filters could be added to the construction of the active sunglasses that would preferentially pass red light. These would be useful since they would increase the visibility of tail lights in a number of driving situations both day and night. Infrared (IR) blocking filters could also be added that would reduce the heat load from the sun to the retina. Further, the lenses could be polarized.

Thus, the active sunglasses can darken or reduce the light intensity in regions in the field of view of a user that exceed some calculated or stored criteria. The dynamic range of light in the field of view is defined as Va–Vb, where Va is the light level of the brightest portion of the field of view and Vb is the light level of the lowest or least well lit portion of the field of view. If the areas of light reduction in the field of view do not produce light levels at the eye that are below that found in the lowest light level portions of the field, then the total or dynamic range of light in the field of view is reduced since Va is reduced and Vb is unaffected. The dynamic range of the light allowed through the shutter matrices to reach the eyes may be limited by selection of appropriate user modes. It is this ability of the active sunglasses to limit the dynamic range of the light level to an existing field of view value, or to some previously selected limits, that reduces vision distractions, optical confusion and loss of information from the field of view.

The rate of change of the average value of light intensity of the field of view can be reduced by storing data from an earlier array map and referencing all new data collected from the current field of view against this earlier version. Hence any source or object that exceeded the levels gleaned from this earlier view would be reduced in intensity. The levels stored in this reference map could then be slowly updated in the direction provided by the real time sensor array map. Consequently, the average light level of the field of view will increase at some user selected rate that was set and stored earlier. This type of operation is the equivalent of an individual squinting after exiting a darkened theater to allow the eyes to adjust to the increased light level before fully opening them.

Although the configuration described above is one where the sensor arrays 6 and 7 consists of 64 LCD elements that correspond to the 64 elements of the LCD shutter matrices 8 and 9, other configurations other than 8 by 8 may be used. Further, the sensor arrays 6 and 7 could be a different size and have different numbers of LCD elements in the rows and columns than the shutter matrices 8 and 9. In addition, the LCD elements of a shutter matrix and/or a sensor array may be shaped as squares, hexagonal, rectangular or circular. Yet further, the shutter matrix and sensor array may be irregular in shape, and each element may vary in size and/or shape depending upon its position in the matrix or array. It should also be understood that the averaging and mapping operations performed by the control electronics 16 and 17 allow different granularities of the sensors and the shutters to be handled operationally. Additionally, fringe shutter elements, or LCD elements that are contingent to darkened elements, can be completely (or partially darkened) to handle element granularity (where the sensor array is different in size than shutter matrix). Such operation also compensates for glazing or blooming, which may occur, for example, when viewing the sun through a car windshield covered with dirt, street oil or the like.

Another mode option is to select the peripheral or contiguous elements of a darkened area to be darkened as well, particularly when only a single LCD element needs to be darkened on the shutter matrix to completely cover the source. Such operation may be preferred for use with sunglasses because if only a single element is darkened, slight movements of the head, or a change in the vehicle heading, or changes in the apparent size of the source can cause either a new element of the shutter matrix to be darkened, or other elements to be darkened because of straddling. This jitter or flashing of the darkened shutter elements may be undesirable, and can be reduced by requiring a predetermined minimum number of elements to be darkened to occlude a target source. Further, these peripheral LCD elements can be transitionally darkened so as to provide a smooth change in light level from regions in the center of the bright area (which will have the appropriate shutter matrix elements darkened) to other shutter matrix elements. For example, the light reflected from the hood of an operator's vehicle may cause only four shutter matrix elements to be darkened, but depending upon the operating mode selected by the user of the sunglasses, the shutter matrix elements in contact with these darkened elements might have the amount of light transmission reduced so that the resulting light level in the field of view from these elements would be midway between that of the central darken elements and that of the average of the rest of the field of view. Such operation will reduce the "ink spot" effect that may otherwise occur in the field of view, and provides a more general transition from the affected area to the unaffected field of view, which may be more acceptable to some users. This is a particularly appropriate technique for shutter matrices having a large number of elements, in particular 8 by 8 or larger arrays. This technique can be applied to more than one transitional level and could be extended to two or more regions of decreasing attenuation away from the bright source or sources to regions of normal light distribution.

Different modes of operation are possible with the active sunglasses 1 to customize their operation to the tastes and comfort of a user. The user control or switches on both temples can be used in combination with lens "icons" or analog types of displays portrayed by darkening elements of the shutter matrix to permit more complex operation options and constants to be loaded and stored in the control electronics. For example, to load an "L" constant which defines the light level at which attenuation takes place might require the following steps. First, a set up mode of operation is entered which might consist of depressing the 2nd switch of the user control 20 on the left temple 2 three times, waiting until the shutter matrix 8 of left lens 4 darkens momentarily, and then depressing the first switch 21 on the right temple 3 twice. Messages could be presented on either lens while this is in progress to guide the user. This sequence of steps would then put the user into the set up mode for the light level. The left lens 4 might display a message "SETM" for "set manually" while the right lens 5 displays a message "SL" for "Set Level" threshold. If the user is wearing the sunglasses, it is likely that he might have trouble focusing on messages presented so close to the eye. Thus, the preferred technique (with the former being user selectable) is to have the user position himself in front of a mirror while wearing the sunglasses for this set up procedure, wherein the messages, icons, and the like are spelled out in reverse so that they can be read in the mirror. The elements of the shutter matrices 8 and 9 can be controlled by darkening them to spell words or to create icons or other special shapes to guide the user in this process. To confirm a procedure, the user depresses the first right user control 20 once. A vertical bar then appears on the shutter matrix 8 of the left lens 4, with a single darkened element marking the present setting. Depressing the first switch 20 on left the temple 2 moves up the threshold and the darkened element will move up to its new position, while depressing the second left switch 20 causes the darkened element to move down. Saving the new configuration in memory is accomplished by depressing the first switch 21 on the right temple 3 once, resulting in the left lens 4 displaying the message "SL??" for "Set Level?". A second depression of the first switch 21 on the right temple 3 causes the left lens 4 to display the message "SL!!" for "Level has been Set". A third depression of the right switch 21 saves the user inputs, exits the set up mode and returns the sunglasses to normal operation. These preset values or user constants are now stored in non-volatile memory and are automatically loaded when the active sunglasses are powered up for use. It will be apparent to one skilled in the art that the above described operation is but one possible sequence of commands and control settings, and that numerous other variations are possible. For example, the set-up procedure may require the user to remove the sunglasses to read the display.

Other modes that may be controlled by the user concern the manner in which the LCD elements of a shutter matrix are controlled to provided attenuation to the visual field of view. A user could select between two or more of such modes to control how light levels that exceed a predetermined threshold are presented. For example, Mode 1 could provide maximum attenuation to reduce the transmissivity of the LCD elements to a minimum for the location of a bright source in the field of view, thus making any very bright area quite dark. Mode 2 could provide attenuation to any light source that provides illumination exceeding the average light level of the field of view by some constant Nx, so that the largest signal presented in the view of the user is within three times the average light level. A Mode 3 could be configured such that any light source that exceeds the average of the field of view by some constant Ny is attenuated by controlling the LCD elements of the shutter matrix so that light levels passing through these elements are less than the average light level in the field of view, but no less bright than that from the minimum element in the viewing field. Finally, a Mode 4 could be configured so that light exceeding some multiple of the average lighting level of the field of view would be attenuated so that the resulting lighting levels of these bright areas as seen by the user eyes would be attenuated in a logarithmic fashion or in logarithmic bands, said bands dependent upon the intensity of the light level. The active sunglasses could operate so that a user only has to go into the set-up mode and select either of Modes 1, 2, 3 or 4, wherein icons for each mode may be displayed in reverse or normal characters on the shutter matrix. A panic mode may also be available where all of the LCD elements of one or both lenses are converted to transparent operation in special situations, such as when a low power level exists or in the event of an unusual light distribution level. This might be achieved by pressing all of the user control switches simultaneously on either the left or right temples 2 or 3. Further, a number of additional modes are possible to allow other bright light strategies to be implemented and that could be selected by a user. A more sophisticated model might permit a user to input threshold levels, or to permit several preset levels to be set up by more than one user. Alternatively, these modes may be set at the factory with preset threshold levels to allow ease of initial use.

In summary, the described invention blocks light from a bright source by controlling LCD materials that make up the shutter matrix elements. It would be advantageous to be able to control the amount of attenuation of the bright source provided by the LCD elements of the shutter matrix so that its presence can still be seen, with just its intensity reduced so as to make it more appropriate to the light level of the rest of the field of view. This can be accomplished because the sensor array and the shutter matrix use the same LCD material for their respective operation. The actual degree of attenuation can be controlled by varying either the level of the driving voltage, or the relationship of the timing to the individual elements of the LCD matrices. Such procedures can be used to find the appropriate level of attenuation for the sensor array as well as to control the degree of attenuation of the shutter matrices. This provides a mechanism to allow the sensor array to be driven to provide the level of attenuation desired by the user.

In some circumstances the presence of a bright light source is not of particular interest and hence it can be blocked out completely. In other situations, such as night driving, the presence of headlights of an approaching vehicle or tail lights of another vehicle may be quite important. Thus, reflections from headlights on the highway might produce a bloom or bright spot that should not be completely blotted out, only reduced in intensity. Therefore, the present sunglasses allow different strategies of light attenuations to be effected by the user, through use of the user controls or switches to select the desired mode as well as to set the desired threshold at which attenuation will become effective.

Having described in detail an embodiment of my invention, it will now be apparent to those skilled in the act that numerous modifications can be made therein without departing from the scope of the invention as defined in the following claims.

I claim:

1. A device that selectively reduces the intensity of light in the field of view of an optical instrument, comprising:

a power source;

a light sensor capable of obtaining light direction and intensity data and of generating at least one light signal corresponding to the direction and light intensity of selected segments in the field of view;

a means for digitizing the light signal to n bits of digital resolution;

a plurality of programmable shutter elements connected to a lens of the optical instrument, wherein each shutter element can be independently selected and each has controllable transmission characteristics enabling a shutter element to be modified only to the extent required by the light intensity conditions;

a memory; and processing circuitry, connected to the power source, to the memory, to the light sensor and to the shutter elements, which processes the digitized light signals with respect to predetermined values stored in the memory, and modifies the light transmission characteristics of certain of the shutter elements if required depending on the processing results.

2. The apparatus of claim 1, wherein the light sensor comprises:

an array of selectively switchable liquid crystal display elements; and a photodetector.

3. The apparatus of claim 2, wherein each selectively switchable element of the light sensor is in a fixed relationship to the shutter elements.

4. The apparatus of claim 1, wherein the light sensor is a photodetector.

5. The apparatus of claim 1, wherein the light sensor is an array of photodetectors.

6. The apparatus of claim 1, wherein the plurality of programmable shutter elements are liquid crystal display elements.

7. The apparatus of claim 1, wherein the power source is a battery.

8. The apparatus of claim 1, further comprising a low-power indicator.

9. A method for selectively modifying the intensity of light from at least one target in the field of view of a lens of an optical instrument comprising:

obtaining light intensity and direction data in the field of view of the optical instrument;

generating at least one light signal from the intensity and direction data with respect to predetermined values stored in a memory;

digitizing each light signal to n bits of digital resolution;

selecting at least one programmable shutter element connected to the lens; and modifying each selected shutter element to the extent required.

10. The method of claim 9, further comprising utilizing the digitized light signals to modify shutter elements on two or more lenses.

11. The method of claim 9, wherein the step of modifying a shutter element comprises darkening the element to the extent necessary to prevent a deleterious effect of a bright light source on recording media.

12. The method of claim 9, wherein the step of modifying a shutter element comprises darkening the element to the extent necessary to prevent a deleterious effect of a bright light source on the eye of a user.

13. The method of claim 9, wherein the step of modifying a shutter element comprises lightening the element to the extent necessary to enable the recording media to record details in the field of view.

14. The method of claim 9, further comprising:

storing each digitized signal;

processing the digitized signals; and utilizing the processed signals to gradually lighten the formerly darkened shutter elements.

15. The method of claim 9, wherein the predetermined values stored in memory may be modified.

16. A light reduction device for reducing the amount of light intensity in the field of view, comprising:

a power source;

a control means for selecting a global change mode of operation;

a light sensor for obtaining light intensity and direction measurements and for generating at least one digitized light signal corresponding to the current light intensity and direction of targets in the field of view;

a memory for storing digitized data corresponding to a previous array map of light intensity measurements;

a plurality of controllable light transmissive shutter matrix elements spacially separate from the light sensor, wherein one of a family of modification rates can be set for all of the elements; and processing circuitry, connected to the power source, the control means, the light sensor, the memory and the shutter elements, wherein when the global change mode is selected, the processing circuitry processes the light signals, compares them to the previous array map data in memory, and then modifies the light transmission characteristics of each of the shutter elements according to the modification rate if the light signal exceeds that of the stored data.

17. The apparatus of claim 16, further comprising a control means for changing the modification rate.

18. A method for utilizing a light reduction device having controllable light transmissive shutter matrix elements to reduce the amount of light intensity in the field of view, comprising:

selecting a global change mode of operation;

setting a family of modification rates for each light transmissive element in an array of such elements;

storing digitized data corresponding to a previous array map or sufficient amount of representative data of light intensity measurements in the field of view;

measuring the amount of light currently in the field of view;

comparing the current measured amount of light to the stored digitized array map data; and globally modifying each light transmissive element according to its modification rate whose selection is determined by the magnitude and direction of the change in light if the light signal is sufficiently different from that of the stored data.

* * * * *